July 28, 1931.  J. L. DRAKE ET AL  1,816,180
APPARATUS FOR PRODUCING SHEET GLASS
Filed May 2, 1930
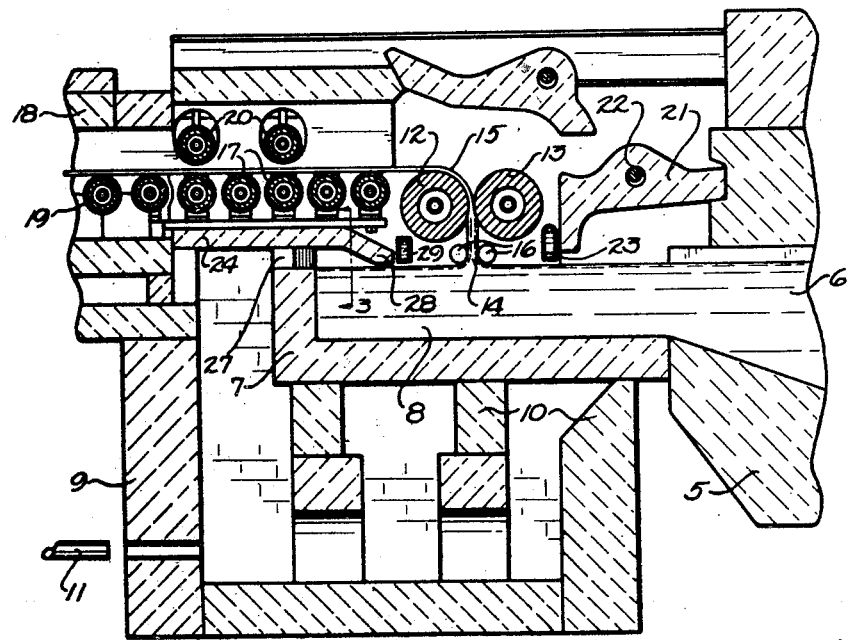
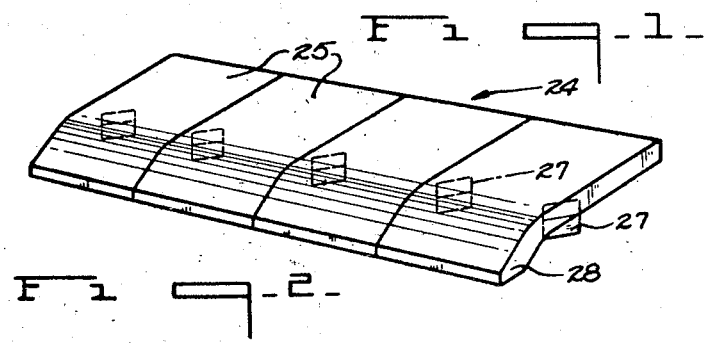
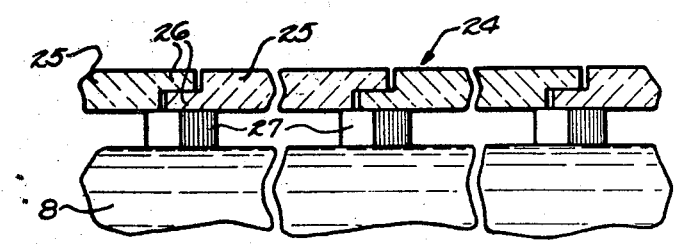
INVENTOR
John L. Drake
Luke C. Mambourg
BY
Frank Fraser
ATTORNEY Patented July 28, 1931

1,816,180

UNITED STATES PATENT OFFICE

JOHN L. DRAKE, OF TOLEDO, AND LUKE C. MAMBOURG, OF LANCASTER, OHIO, ASSIGNORS TO LIBBEY-OWENS-FORD GLASS COMPANY, OF TOLEDO, OHIO, A CORPORATION OF OHIO

APPARATUS FOR PRODUCING SHEET GLASS

Original application filed August 20, 1927, Serial No. 214,278. Divided and this application filed May 2, 1930. Serial No. 449,807.

The present invention relates to an improved apparatus for producing sheet glass, and this application is a division of our copending application filed August 20, 1927, Serial No. 214,278.

In accordance with this invention, there is provided an apparatus adapted for the production of sheet glass and embodying briefly a working receptacle supported above a heating chamber and containing a mass of molten glass. A pair of forming rolls are arranged above the molten glass preferably in close proximity thereto, said rolls being rotatable in such a manner as to draw a relatively thick body of molten glass upwardly from the molten mass and reduce it to a sheet having a predetermined and uniform thickness, said sheet being preferably deflected into a horizontal plane about one of said rolls and passed horizontally into and through an annealing leer.

The general object of the present invention is the provision of a novel type of lip-tile and manner of mounting the same, said lip-tile being located above one end of the receptacle and supported in such a manner as to provide passages or flues therebeneath so that a portion of the heat within the heating chamber can pass therefrom beneath the lip-tile and be directed thereby downwardly upon the molten glass within the working receptacle so as to assist in properly conditioning the same whereby to facilitate and improve the formation of the sheet.

Other objects and advantages of the invention will become more apparent during the course of the following description.

In the drawings wherein like numerals are employed to designate like parts throughout the same, Fig. 1 is a fragmentary vertical longitudinal section through a machine embodying the present invention, Fig. 2 is a perspective view of the improved lip-tile removed from the machine, and Fig. 3 is a vertical section taken on line 3—3 of Fig. 1.

In the drawings, the numeral 5 designates a tank furnace adapted to contain a mass of molten glass 6. Connected to the tank furnace 5 is a receptacle 7 which is adapted to be constantly supplied with a mass of molten glass 8 from the mass contained in said furnace. Preferably, the receptacle 7 is in the form of a pot and is adapted to contain a relatively more shallow mass of molten glass than that contained in the tank furnace proper to facilitate a more accurate control of the molten glass, although the invention is not restricted to the depth of this glass. To assist in controlling the temperature of the molten glass 8, the pot or other receptacle 7 is preferably surrounded by a compartment 9 in which are arranged pot stools 10 for supporting the receptacle, while heating means 11 are provided to control the temperature of said pot chamber and thus assist in controlling the temperature of the glass.

It will be seen in Fig. 1 that a pair of rolls 12 and 13 respectively are arranged above the surface of the mass of molten glass 8. It is preferable that these rolls be arranged in a horizontal position such as shown, which means that a line drawn through the axes of the two rolls will be horizontally disposed, although the rolls can, of course, be arranged in a vertical position if desired. The rolls are preferably positively driven and in such a manner that after a sheet has been started by the use of a bait or other means as is well understood in the art, a relatively thick mass of glass 14 will be drawn or moved vertically from the pot. The numeral 15 designates the sheet which has been formed from the mass 14 after it has passed between said rolls. The rolls 12 and 13 are adjustably mounted to permit the production of any desired thickness of sheet and are arranged to create a sheet forming pass as is clearly shown in Fig. 1 which directly controls the thickness of sheet produced. The mass 14 is of sufficient thickness to supply the necessary amount of glass to the sheet forming pass to permit an actual rolling or reduction in thickness so that the finished sheet has a thickness less than that of the mass 14.

The heavy body of glass 14 may be created by proper temperature regulation and control of the molten mass 8 and also by the speeds of the machine. To further assist in building up a requisite body of glass 14, edge engaging rolls 16 may be used.

The roll 12 is preferably normally held in a fixed position, while the roll 13 is adjustably mounted with respect to the first mentioned roll. It will be seen that the sheet 15 is deflected from a vertical into a horizontal plane over the roll 12, and it is also to be noted that the space between the peripheries of the rolls 12 and 13 at their closest point of approach is the controlling factor in the thickness of the sheet produced. In other words, the thickness of sheet produced is the same as the space between the rolls. Further, it will be noted that if sufficient glass is fed to the rolls, and with the present invention such is the case, the finished sheet will be of uniform thickness throughout, which thickness is also predetermined by the proper adjustment of the roll 13 with respect to the roll 12. The sheet 15 is carried on conveying rolls 17 which convey the said sheet to an annealing leer 18 in which may be arranged supporting and conveying rolls 19.

Mounted above the rolls 17 are one or more rolls 20, which rolls are illustrated in Fig. 1 in a raised position and out of contact with the sheet of glass 15. These rolls are constantly rotated when the machine is in operation to prevent warping due to the heat. When it is desired to use the rolls, they are lowered into position and adapted to contact with the sheet. These rolls may be used to prevent buckling of the sheet and to also assist in conveying the same from the rolls and over the lower conveying rolls 17, but the pressure exerted by the rolls 20 is so controlled that they do not cause any reduction in the thickness of the sheet.

To assist in properly conditioning the molten glass 8 and to protect the mass 14 and sheet 15, a lip-tile 21, supported on a suitable bracket 22, is used. A cooler 23 is associated with the lip-tile in the manner shown in Fig. 1 and prevents heat and gases from striking the rolls 12 and 13 and also from striking and injuring the glass 14. On the opposite side of the sheet a specially constructed lip-tile, designated in its entirety by the numeral 24, is used. In Figs. 2 and 3 is shown in detail the construction of the lip-tile 24, and it will be seen that the tile is formed from a plurality of sections 25 provided with cooperating tongues 26. Thus, the sections 25 are arranged side by side with the cooperating tongues 26 being provided along their adjacent side edges. The lip-tile is supported on suitable spaced refractory blocks or other supports 27 resting on the end of the pot 7, the supports 27 preferably being arranged at the juncture of the sections of said tile. Due to the construction of the tile and the method of mounting the same, it is possible to have the sheet 15 in its horizontal run arranged relatively close to the surface of the molten glass 8 which permits the use of the rolls 12 and 13 in the positions illustrated in the drawings. With the old type of tiles commonly used, it is practically impossible to use the present arrangement for producing sheet glass satisfactorily.

In addition, by supporting the tile 24 at a plurality of spaced points by the blocks 27, passageways or flues are provided between said blocks through which heated air and gases may pass from the pot chamber 9 to assist in conditioning the molten mass 8. Thus, heat coming from the compartment 9 in which the pot is supported is allowed to pass up and under the lower surface of the tile, being directed downwardly upon the surface of the molten glass by means of the downwardly inclined end 28 of the tile. The proper conditioning of the glass near the closed end of the receptacle 7 has a considerable bearing on the formation of the mass 14. While the supporting blocks 27 are here shown as resting directly upon the closed end of the receptacle, they could, of course, be positioned just back of the end wall, (being supported by brackets or the like), and serve the same purpose. Therefore, it is to be understood that this invention is not limited to the positioning of the supporting blocks directly upon the closed end of the pot.

Cooperating with the tile 24 is a heat absorbing shield 29 preferably arranged very close to the surface of the molten bath and thus preventing an appreciable escape of heat from beneath the lip-tile 24 so as to protect the mass of glass 14 from the heat applied to the surface of the glass 8.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

We claim:

1. In sheet glass apparatus, a receptacle containing a mass of molten glass, means for forming a sheet therefrom, means for heating the receptacle, a tile, and means for supporting said tile on the receptacle, said supporting means being of such character as to provide spaced openings through which heated gases may pass under the tile.

2. In sheet glass apparatus, a receptacle containing a mass of molten glass, means for forming a sheet therefrom, means for heating the receptacle, a tile, supporting means contacting with the tile at spaced points, the supporting means forming heat conducting passageways between the points where it contacts with the tile and through which heated gases may pass from the receptacle heating means.

3. In sheet glass apparatus, a receptacle containing a mass of molten glass, means for forming a sheet therefrom, means for heating the receptacle, a tile, and a plurality of spaced supports therefor resting on the receptacle, the spaces between the supports forming passageways for heated gases.

4. In sheet glass apparatus, a receptacle containing a mass of molten glass, means for forming a sheet therefrom, means for heating the receptacle, a tile, and a plurality of spaced tile supporting means resting on the receptacle and on which the tile is supported, the spaces between the supporting means forming flues through which heated gases may pass from the receptacle heating means when the tile is in operative position.

5. In sheet glass apparatus, a receptacle containing a mass of molten glass, means for forming a sheet therefrom, means for heating the receptacle from beneath, a tile, and a plurality of spaced tile supporting means resting on the receptacle and on which the tile is supported, the spaces between the supporting means forming flues through which heated gases may pass from the receptacle heating means when the tile is in operative position.

6. In sheet glass apparatus, a receptacle containing a mass of molten glass, means for forming a sheet therefrom, a heating compartment beneath the receptacle, a tile, and a plurality of spaced tile supporting means carried by the receptacle and on which the tile is supported, the spaces between the supporting means forming flues through which heated gases may pass from the heating compartment when the tile is in operative position.

7. In sheet glass apparatus, a receptacle containing a mass of molten glass, means for forming a sheet therefrom, a plurality of blocks mounted in spaced relation on the end of said receptacle, a tile supported on said blocks, and means for heating the receptacle containing the mass of molten glass, a portion of the heat passing between the spaced blocks and acting upon the surface of the glass in the receptacle.

8. In sheet glass apparatus, a receptacle containing a mass of molten glass, means for forming a sheet therefrom, a heating compartment beneath said receptacle, a tile, and a plurality of spaced supporting elements resting upon the receptacle for supporting said tile intermediate its ends, the spaces between said supporting elements forming flues in communication with the heating compartment so that a portion of the heat from said compartment can pass through said flues beneath the tile.

9. In sheet glass apparatus, a receptacle containing a mass of molten glass, means for forming a sheet therefrom, a heating compartment beneath the receptacle, a tile, means for supporting the same, said supporting means being provided with a plurality of flues through which heated gases may pass from the heating compartment and be directed downwardly upon the glass within the receptacle.

Signed at Toledo, in the county of Lucas, and State of Ohio, this 28th day of April, 1930.

JOHN L. DRAKE.

Signed at Lancaster, in the county of Fairfield, and State of Ohio, this 30th day of April, 1930.

LUKE C. MAMBOURG.